(12) United States Patent
Fan et al.

(10) Patent No.: US 11,792,810 B2
(45) Date of Patent: Oct. 17, 2023

(54) DETERMINATION OF PHYSICAL DOWNLINK CONTROL CHANNEL RECEIVE TIME BASED ON PHYSICAL DOWNLINK SHARED CHANNEL REFERENCE SYMBOL

(71) Applicant: QUALCOMM Incorporated, San Diego, CA (US)

(72) Inventors: Zhifei Fan, San Diego, CA (US); Jing Sun, San Diego, CA (US); Xiaoxia Zhang, San Diego, CA (US); Tao Luo, San Diego, CA (US); Srinivas Yerramalli, Hyderabad (IN); Arumugam Chendamarai Kannan, San Diego, CA (US); Wooseok Nam, San Diego, CA (US); Sungwoo Park, Seoul (KR); Ahmed Abdelaziz Ibrahim Abdelaziz Zewail, San Diego, CA (US); Akula Aneesh Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/159,408

(22) Filed: Jan. 27, 2021

(65) Prior Publication Data

US 2021/0243735 A1     Aug. 5, 2021

Related U.S. Application Data

(60) Provisional application No. 62/968,848, filed on Jan. 31, 2020.

(51) Int. Cl.
*H04W 72/10*      (2009.01)
*H04L 5/00*      (2006.01)
*H04W 72/23*      (2023.01)

(52) U.S. Cl.
CPC .......... *H04W 72/23* (2023.01); *H04L 5/0048* (2013.01)

(58) Field of Classification Search
CPC .......................... H04W 72/042; H04L 5/0048
See application file for complete search history.

(56) References Cited

U.S. PATENT DOCUMENTS

2018/0014268 A1*   1/2018   Kuppusamy .......... H04L 27/266
2018/0124753 A1*   5/2018   Sun ....................... H04L 1/0079
(Continued)

FOREIGN PATENT DOCUMENTS

WO     2018058056 A1     3/2018
WO     2020032743 A1     2/2020

OTHER PUBLICATIONS

Huawei, et al., "Details of Two-Level DCI Schemes for Short TTI", 3GPP Draft, R1-1608634, 3GPP TSG RAN WG1 Meeting #86bis, 3rd Generation Partnership Project (3GPP), Mobile Competence Centre, 650, Route Des Lucioles, F-06921 Sophia-Antipolis Cedex; France, vol. RAN WG1, No. Lisbon, Portugal, Oct. 10, 2016-Oct. 14, 2016, Oct. 9, 2016 (Oct. 9, 2016), 7 Pages, XP051148693, Retrieved from the Internet: URL: http://www.3gpp.org/ftp/Meetings_3GPP_SYNC/RAN1/Docs/ [retrieved on Oct. 9, 2016], Section 3 .1.

(Continued)

*Primary Examiner* — Ronald B Abelson
(74) *Attorney, Agent, or Firm* — Muncy, Geissler, Olds & Lowe

(57) ABSTRACT

In an aspect, a PDCCH and a PDSCH are transmitted by a BS to a UE, whereby the PDCCH includes a first DCI part and the PDSCH includes a second DCI part (e.g., a 2-part DCI). In an example, the BS and UE each determine at least (Continued)

one timing value associated with an effective receive time for the PDCCH based upon a reference symbol of the PDSCH.

30 Claims, 9 Drawing Sheets

(56) References Cited

U.S. PATENT DOCUMENTS

| | | | |
|---|---|---|---|
| 2020/0015202 A1* | 1/2020 | Khoshnevisan | H04L 1/1864 |
| 2020/0204293 A1* | 6/2020 | Kim | H04L 5/0094 |
| 2020/0374884 A1* | 11/2020 | Xing | H04W 72/0446 |
| 2020/0404617 A1* | 12/2020 | Murray | H04W 52/0229 |
| 2021/0243745 A1* | 8/2021 | Fan | H04B 7/2656 |
| 2021/0298045 A1* | 9/2021 | Kim | H04W 72/0453 |
| 2021/0360523 A1* | 11/2021 | Hwang | H04L 5/0053 |
| 2023/0023719 A1* | 1/2023 | Ji | H04W 72/046 |

OTHER PUBLICATIONS

International Search Report and Written Opinion—PCT/US2021/015412—ISA/EPO—dated Jun. 14, 2021.

ITRI: "Discussion on Two-Stage DCI for NR", 3GPP Draft, 3GPP TSG-RAN WG1 Meeting #89, R1-1708717, Discussion on Two-Stage DCI for NR, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 14, 2017 (May 14, 2017), XP051273900, 4 Pages, Retrieved from the Internet: URL: http://www.3gpp.org/ftp/Meetings_3GPP_SYNC/RAN1/Docs/ [Retrieved on May 14, 2017] Sections 1 and 2.

ZTE: "NR-PDCCH for Supporting URLLC", 3GPP Draft, R1-1712447, 3GPP TSG RAN WG1 Meeting #90, NR-PDCCH for Supporting URLLC, 3rd Generation Partnership Project (3GPP), Mobile Competence Centre, 650, Route Des Lucioles, F-06921 Sophia-Antipolis Cedex, France, vol. RAN WG1. No. Prague. Czechia, Aug. 21, 2017-Aug. 25, 2017, Aug. 20, 2017 (Aug. 20, 2017), XP051315263, pp. 1-7, Retrieved from the Internet: URL:http://www.3gpp.org/ftp/Meetings_3GPP_SYNC/RAN1/Docs/ [retrieved on Aug. 20, 2017] Section 3.2.2.

* cited by examiner

DETERMINATION OF PHYSICAL DOWNLINK CONTROL CHANNEL RECEIVE TIME BASED ON PHYSICAL DOWNLINK SHARED CHANNEL REFERENCE SYMBOL

CROSS-REFERENCE TO RELATED APPLICATION

The present Application for Patent claims the benefit of U.S. Provisional Application No. 62/968,848, entitled "DETERMINATION OF PDCCH RECEIVE TIME BASED ON PDSCH REFERENCE SYMBOL", filed Jan. 31, 2020, assigned to the assignee hereof and hereby expressly incorporated by reference herein in its entirety.

BACKGROUND OF THE DISCLOSURE

1. Field of the Disclosure

Aspects of the disclosure relate generally to wireless communications and to techniques and apparatuses related to determination of a Physical Downlink Control Channel (PDCCH) receive time based on a Physical Downlink Shared Channel (PDSCH) reference symbol.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some systems, to reduce control overhead and improve the processing timeline, a downlink control information (DCI) may be split into two portions (or parts). A first DCI portion may be transmitted within a PDCCH, while a second DCI portion may be transmitted within a Physical Downlink Shared Channel (PDSCH), a procedure commonly referred to as a DCI piggyback. The PDCCH and associated PDSCH carrying the respective DCI portions may be transmitted in the same slot or in different slots. The first DCI portion may include initial control information regarding an assignment (or grant), such as the resource assignment, rank and modulation order of the assignment (e.g., UL grant or DL grant). In addition, the first DCI portion may also include control information about the second DCI portion in a control information field.

In an aspect of the disclosure, a method, a computer-readable medium, and an apparatus are provided. The apparatus may be a base station. The base station may schedule, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI. The base station may determine at least one timing value associated with an effective receive time for the PDCCH based upon a reference symbol of the PDSCH, and may transmit the PDCCH and the PDSCH during the at least one slot.

In another aspect of the disclosure, a method, a computer-readable medium, and an apparatus are provided. The apparatus may be a UE. The UE may receive, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI. The UE may determine at least one timing value associated with an effective receive time for the PDCCH based upon a reference symbol of the PDSCH.

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
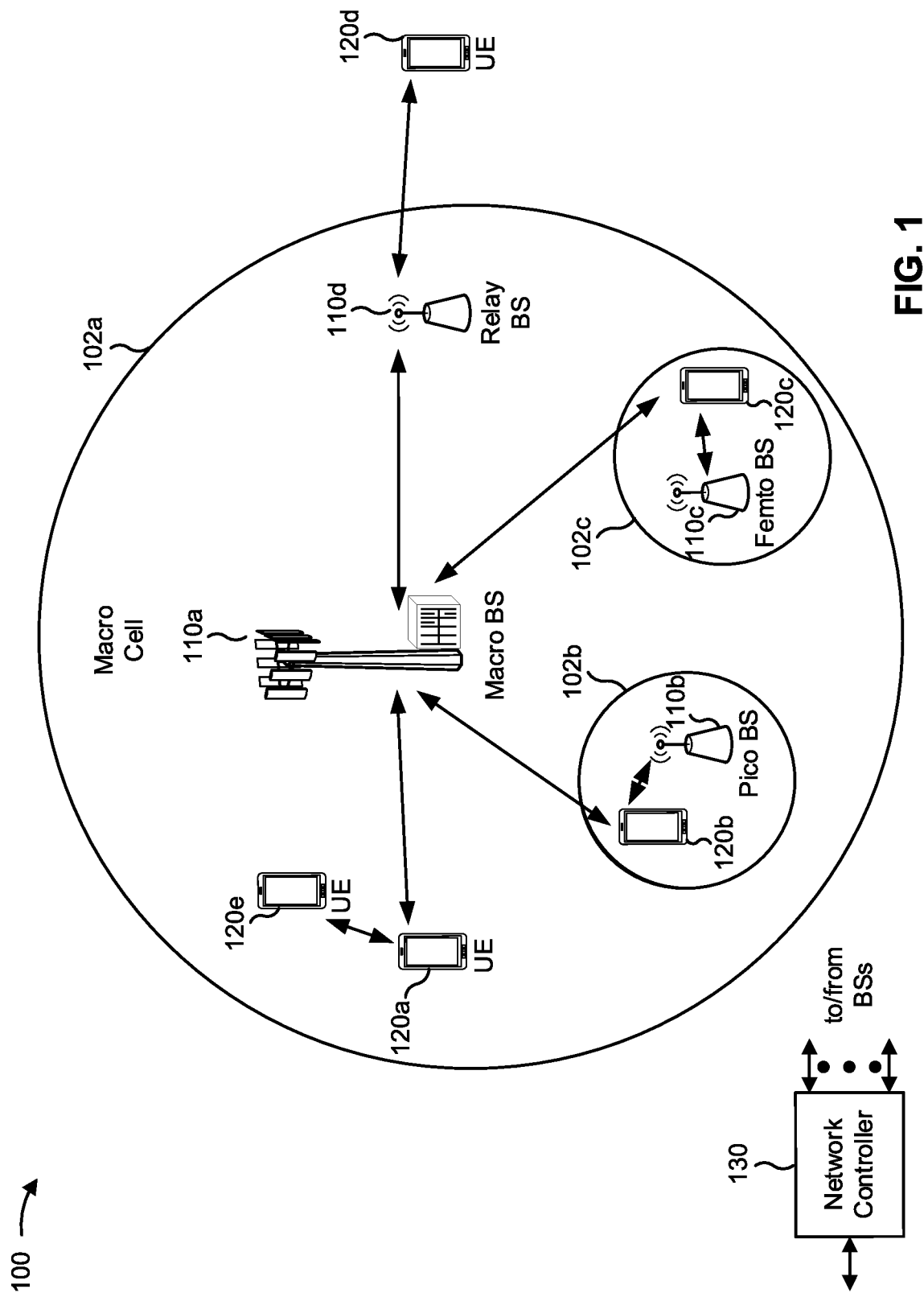
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
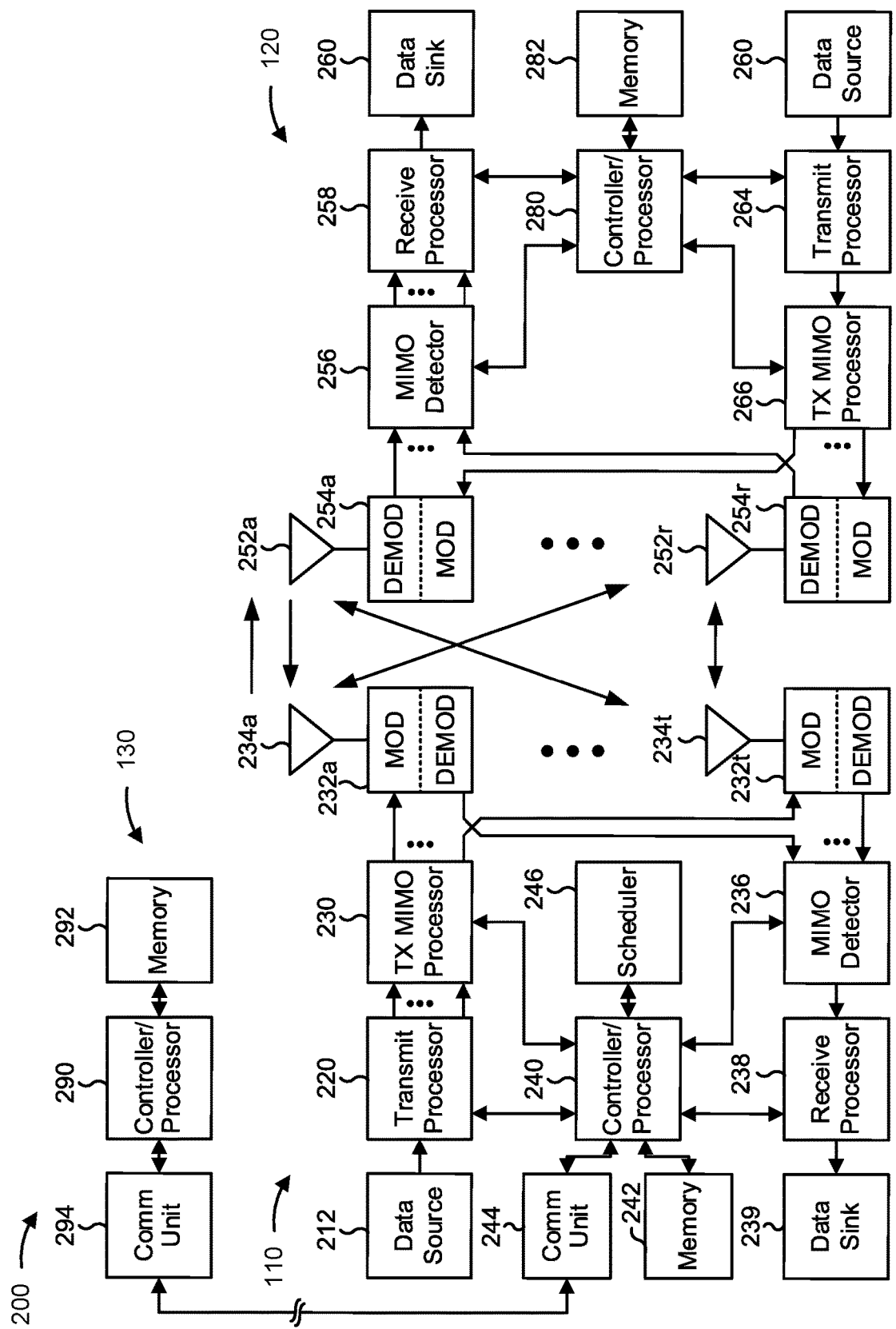
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as Reduced Capability ('RedCap') or 'NR-Light'. Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on.

A Physical Downlink Control Channel (PDCCH) may be used to carry a Downlink Control Information (DCI). The DCI within the PDCCH provides downlink resource assignments and/or uplink resource grants for one or more UEs. Multiple PDCCHs may be transmitted each slot and each PDCCH may carry user-specific DCI or common DCI (e.g., control information broadcast to a group of UEs). Each DCI may further include a cyclic redundancy check (CRC) bit that is scrambled with a radio network temporary identifier (RNTI), which may be a specific user RNTI or a group RNTI, to allow the UE to determine the type of control information sent in the PDCCH.

In some systems, to reduce control overhead and improve the processing timeline, the DCI may be split into two portions. A first DCI portion may be transmitted within a PDCCH, while a second DCI portion, referred to as a DCI 'piggyback' may be transmitted within a Physical Downlink Shared Channel (PDSCH). The PDCCH and associated PDSCH carrying the respective DCI portions may be transmitted in the same slot or in different slots.

The first DCI portion may include initial control information regarding an assignment (or grant), such as the resource assignment, rank and modulation order of the assignment (e.g., UL grant or DL grant). In addition, the first DCI portion may also include control information about the second DCI portion in a control information field. In some examples, the control information may indicate the number of resource elements (size) and code rate of the second DCI portion. The second DCI portion may include remaining control information regarding the grant (and/or other grant(s)). For example, the remaining control information may include non-time critical control information, such as the HARQ process ID, redundancy version ID, a new data indicator, transmit power control indicator, channel quality indicator request, sounding reference signal request, or downlink assignment index. Thus, the UE may utilize the first DCI portion to identify user data traffic within the PDSCH to be decoded and may buffer the user data traffic while the second DCI portion is decoded.

As noted above, the second DCI portion may include multiple grants (e.g., one or more UL grants, one or more DL grants, or a combination thereof). The second DCI portion may be either single-user or multi-user (e.g., using a group RNTI for the first DCI portion in conjunction with an addressing scheme in the second DCI portion for respective UEs to extract their respective parts). In some designs, the first DCI portion can be scheduled in accordance with a semi-persistent scheduling (SPS) protocol, whereas the second DCI portion can be dynamically scheduled via higher-layer signaling (e.g., RRC signaling).

In some NR systems, PDCCH is delivered in the Control Resource Set (coreset). A UE may perform blind decoding (BD) of multiple BD candidates in the coreset to identify a particular DCI targeting that UE. In an example, the PDDCH may be sent with a wider beam than the PDSCH, or alternatively via the same beam as the PDSCH. The BD candidates may be organized in search space sets, and one or more search space sets may be associated with one coreset. The NR PDCCH BD design is carried over from the LTE PDCCH BD design, and is generally optimized for the scenario where multiple UEs are served with PDCCH at the same time (e.g., optimized so as to reduce blocking between UEs to randomly hash locations of PDDCH from different UEs differently in the coreset). In a millimeter wave (mmW) use case, due to the analog beam transmission restriction and very short slots in time domain (due to SCS scaling up) in some NR systems, the chance of sending multiple DCIs to different UEs is greatly reduced (compared to FR1). Instead, it is more likely in such NR systems for multiple DL/UL grants to be transmitted to the same UE (e.g., multiple DL/UL grants to handle relatively long DL/UL bursty traffic).

The above-noted piggybacked DCI design may be particularly useful for mmW implementations. For example, the piggybacked DCI design can help to reduce PDDCH BD so the UE PDCCH processing is made faster. In another example, the piggybacked DCI (or second DCI portion) may share the same beam as the PDSCH (e.g., same QCL) and thus can be more efficiently delivered (e.g., the beam used for PDSCH can be narrower than the PDSCH beam).

In NR systems, the receive time of the PDCCH affects the timing of other procedures, including Channel State Information (CSI) reporting, PUSCH timing, PDSCH timing, and so on. In current NR systems, the PDCCH receive time is based on latest reference symbol of the PDCCH itself. In various embodiments of the disclosure, in a scenario where the PDSCH includes a piggybacked DCI for one (or more) UEs, a reference symbol associated with the PDSCH (as opposed to the PDCCH) may be used to determine the 'effective' receive time of the PDCCH.

Figure 3:
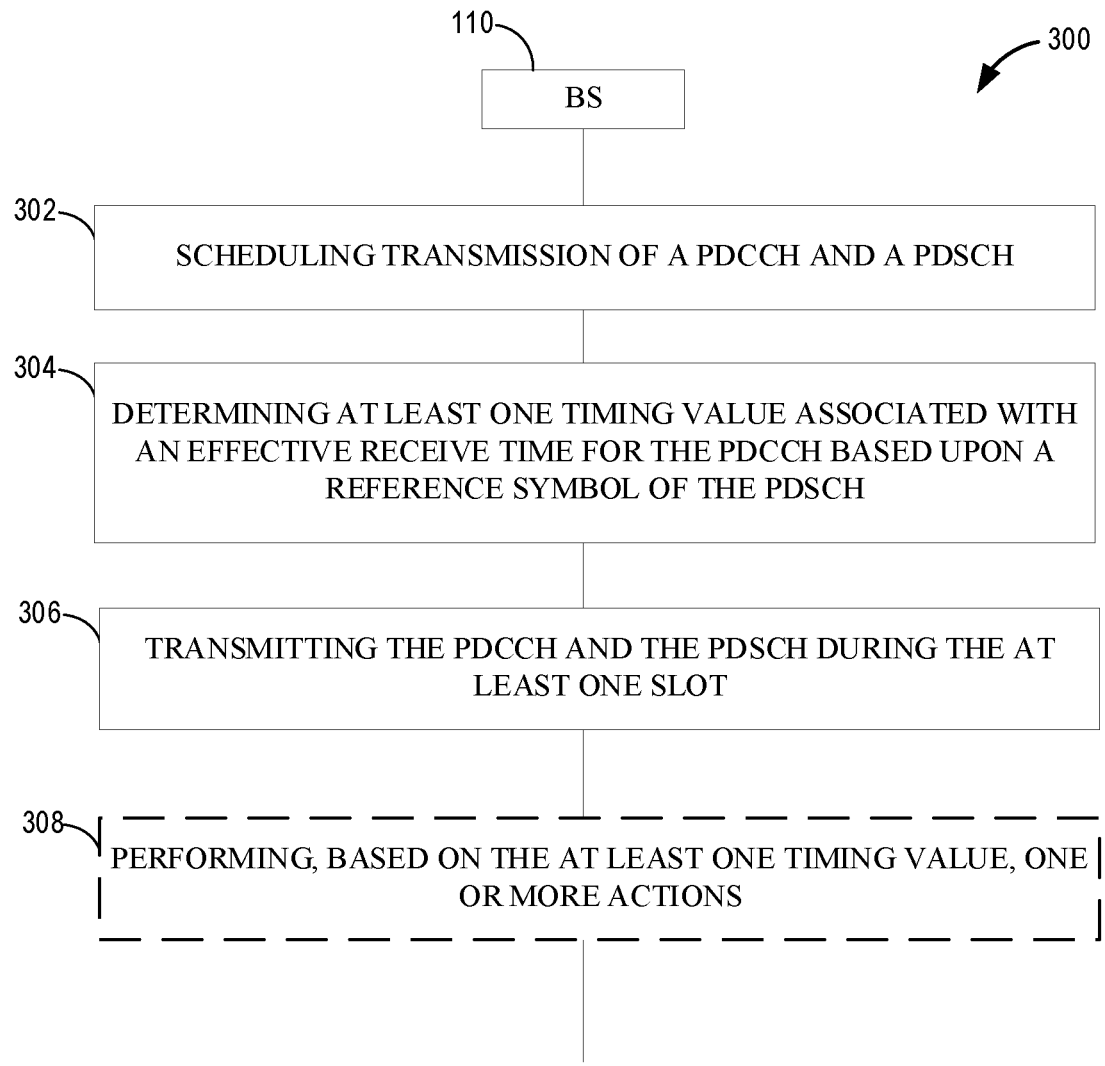
FIG. 3 illustrates an exemplary process of wireless communications according to an aspect of the disclosure.

FIG. 3 illustrates an exemplary process 300 of wireless communications according to an aspect of the disclosure. The process 300 of FIG. 3 is performed by BS 110.

At 302, BS 110 (e.g., scheduler 246, controller/processor 240, etc.) schedules, during at least one slot, transmission of a PDCCH and a PDSCH, the PDCCH including a first part of a Downlink Control Information (DCI), the PDSCH including a second part of the DCI. In an example, the first and second parts of the DCI may comprise a two-part DCI as described above. In some designs, the first DCI part may include a control information field associated with the second part of the DCI within the PDSCH. The second part of the DCI may comprise UL grant(s) and/or DL grant(s), and may be associated with a single UE or multiple UEs. For example, the second part of the DCI may not merely supplement the first part of the DCI (e.g., forming a single two-part DCI), but may include other DCIs as well (e.g., one or more other Part-2 DCIs that form one or more other two-part DCIs, for the same UE or other UE(s)).

At 304, BS 110 (e.g., scheduler 246, controller/processor 240, etc.) determines at least one timing value associated with an effective receive time for the PDCCH based upon a reference symbol of the PDSCH. In some designs, the reference symbol used for the timing value determination may follow the second DCI part within the PDSCH. In some designs, the at least one timing value may comprise a time offset between the effective receive time for the PDCCH and a DCI report, a time offset between the effective receive time for the PDCCH and a PUSCH communication, a time offset between the effective receive time for the PDCCH and a PDSCH communication, or a time offset between the effective receive time for the PDCCH and a Sounding Reference Signal (SRS) communication, or any combination thereof. In some designs, the at least one timing value may be applicable to a DCI-to-beam switching time offset and/or a DCI-to-bandwidth part (BWP) time offset (e.g., to sync in timing with respect to beam transitions or frequency hops, etc.).

At 306, BS 110 (e.g., antenna(s) 234a ... 234t, modulators(s) 232a ... 232a, TX MIMO processor 230, TX processor 220) transmits the PDCCH and the PDSCH during the at least one slot. In an example, the at least one slot may comprise a single slot or multiple slots.

At 308, BS 110 (e.g., antenna(s) 234a ... 234t, modulators(s)/demodulator(s) 232a ... 232a, TX MIMO processor 230, TX processor 220, MIMO detector 236, RX processor 238, etc.) optionally performs, based on the at least one timing value, one or more actions. For example, the one or more actions may comprise receiving a CSI report, or receiving a PUSCH communication, or transmitting a PDSCH communication, or receiving a SRS communication, or any combination thereof. In some designs, the at least one timing value may be applicable to a DCI-to-beam switching time offset and/or a DCI-to-BWP time offset (e.g., to sync in timing with respect to beam transitions or frequency hops, etc.).

Figure 4:
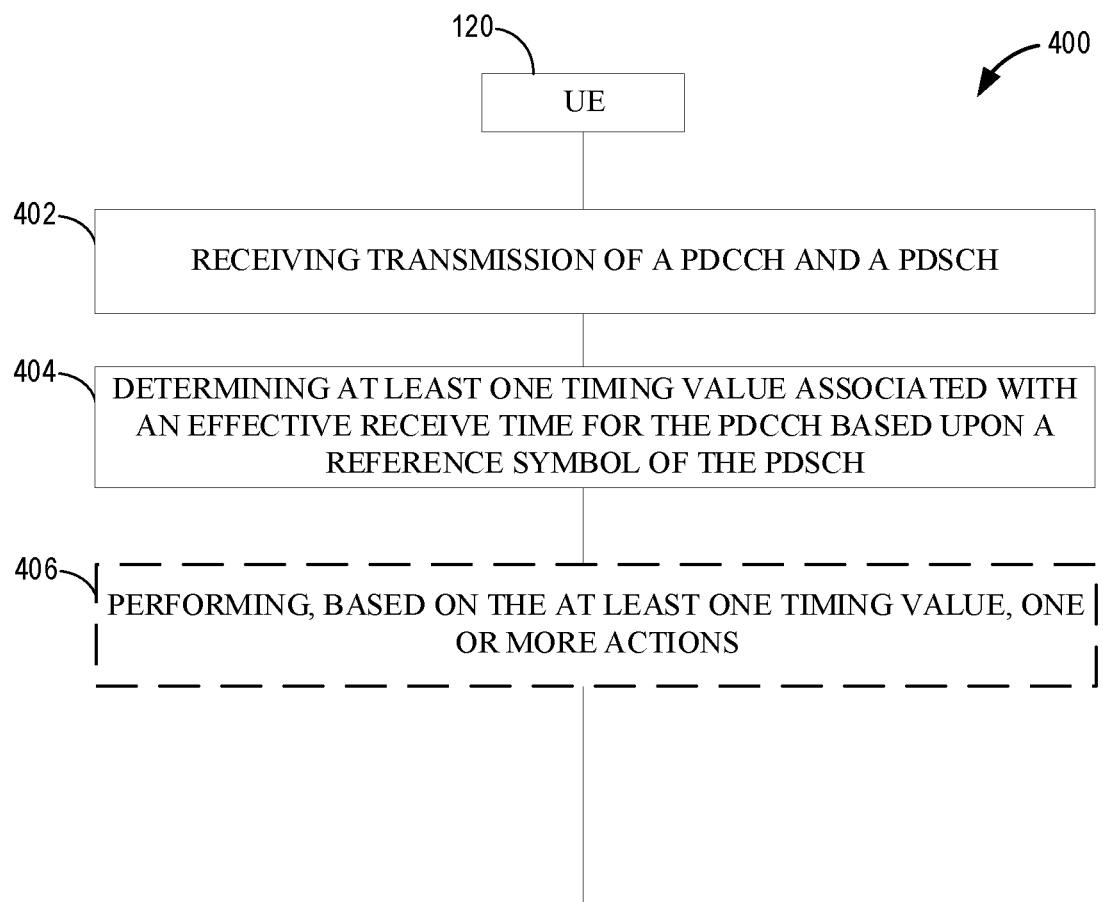
FIG. 4 illustrates another exemplary process of wireless communications according to an aspect of the disclosure.

FIG. 4 illustrates an exemplary process 400 of wireless communications according to an aspect of the disclosure. The process 400 of FIG. 4 is performed by UE 120.

At 402, UE 120 (e.g., antenna(s) 252a ... 252r, MIMO detector 256, receive processor 258, etc.) receives, during at least one slot, transmission from a base station of a PDCCH and a PDSCH, the PDCCH including a first part of a Downlink Control Information (DCI), the PDSCH including a second part of the DCI. In an example, the second part of the DCI in the PDSCH may be a second DCI portion associated with the first DCI part (or initial part of the DCI) in the PDCCH that includes a control information field associated with the second part of the DCI within the PDSCH. In some designs, the second part of the DCI may comprise UL grant(s) and/or DL grant(s), and may be associated with a single UE or multiple UEs. In an example, the at least one slot may comprise a single slot or multiple slots. For example, the second part of the DCI may not merely supplement the first part of the DCI (e.g., forming a single two-part DCI), but may include other DCIs as well (e.g., one or more other Part-2 DCIs that form one or more other two-part DCIs, for the same UE or other UE(s)).

At 404, UE 120 (e.g., controller/processor 280) determines at least one timing value associated with an effective receive time for the PDCCH based upon a reference symbol of the PDSCH. In some designs, the reference symbol used for the timing value determination may follow the second DCI part within the PDSCH. In some designs, the at least one timing value may comprise a time offset between the effective receive time for the PDCCH and a DCI report, a time offset between the effective receive time for the PDCCH and a PUSCH communication, a time offset between the effective receive time for the PDCCH and a PDSCH communication, or a time offset between the effective receive time for the PDCCH and a SRS communication, or any combination thereof.

At 406, UE 120 (e.g., antenna(s) 252a . . . 252r, modulators(s)/demodulator(s) 254a . . . 254a, TX MIMO processor 266, TX processor 265, MIMO detector 256, RX processor 258, etc.) optionally performs, based on the at least one timing value, one or more actions. For example, the one or more actions may comprise transmitting a CSI report, or transmitting a PUSCH communication, or receiving a PDSCH communication, or transmitting a SRS communication, or any combination thereof.

Figure 5:
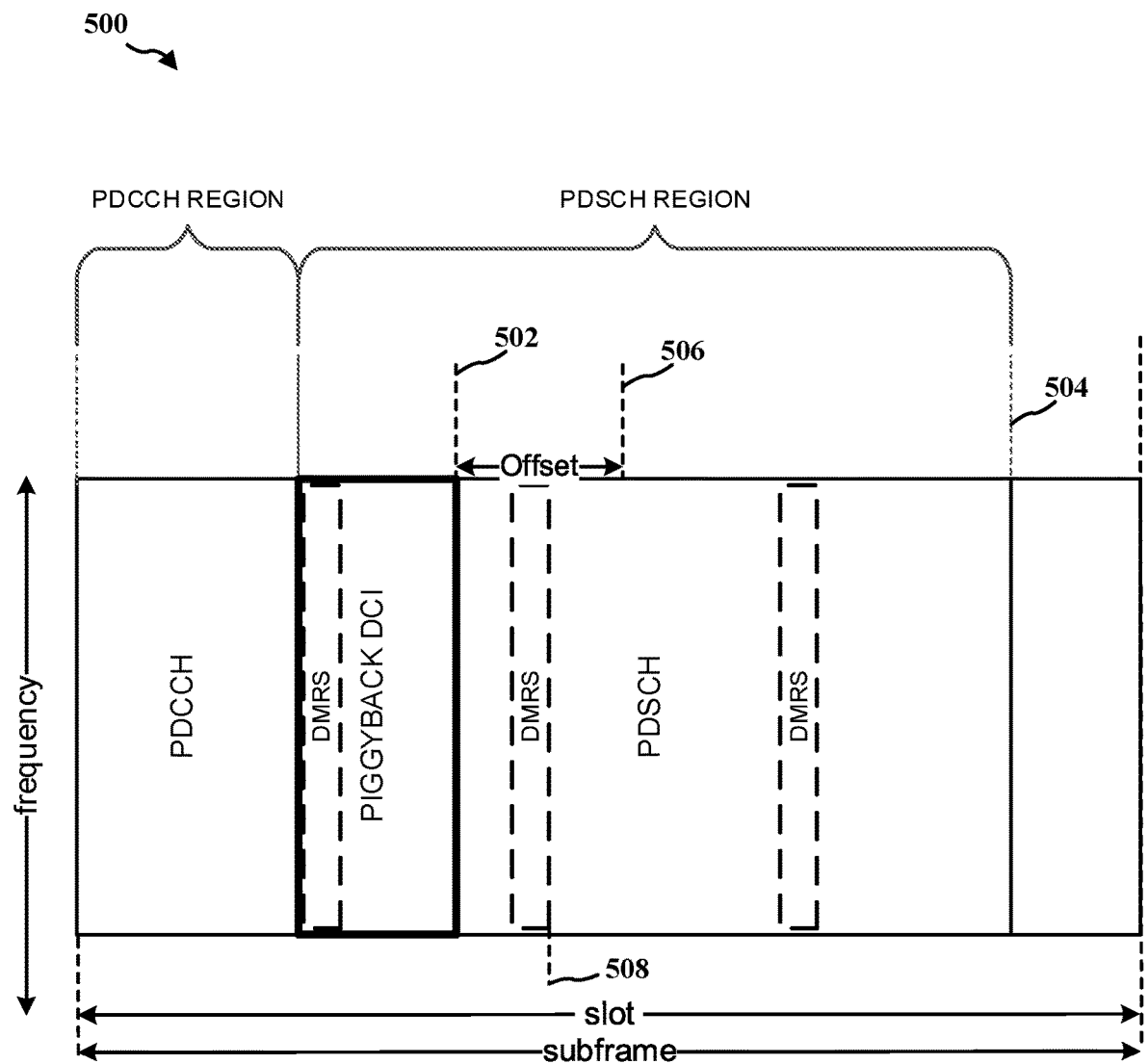
FIG. 5 illustrates a slot according to an aspect of the disclosure.

Referring to FIGS. 4-5, by way of example, determining the effective receive time for the PDDCH using the PDSCH reference symbol (as opposed to a PDCCH reference symbol) provides one or more technical advantages, such as more accurate timing with respect to various operations (e.g., beam and/or BWP switching, various UL and/or DL communications such as CSI reports, PUSCH communications, PDSCH communications, SRS communications, etc.).

FIG. 5 illustrate a slot 500 depicting various reference symbol options for the determination at 304 of FIG. 3 or 404 of FIG. 4 in accordance with an embodiment of the disclosure. In FIG. 5, a PDCCH region of the slot 500 is followed by a PDSCH region. A piggybacked DCI is included near the beginning of the PDSCH region. The PDSCH includes three DMRSs, with one DMRS preceding and/or overlapping with the piggybacked DCI.

Referring to FIG. 5, in a first example, the reference symbol of the PDSCH corresponds to a last symbol 502 of the second part of the DCI (e.g., piggybacked DCI) within the PDSCH. For example, the previous timing relative to the last symbol of the PDCCH may be updated so as to be relative to the last symbol 502 in the PDSCH with the piggybacked DCI. In terms of timing, the last symbol 502 is a fairly aggressive reference symbol option.

Referring to FIG. 5, in a second example, the reference symbol of the PDSCH corresponds to a last symbol 504 of the PDSCH. For example, the previous timing relative to the last symbol of the PDCCH may be updated so as to be relative to the last symbol 504 in the PDSCH. In terms of timing, the last symbol 504 is a fairly conservative reference symbol option.

Referring to FIG. 5, in a third example, the reference symbol of the PDSCH corresponds to a symbol 506 that is offset (e.g., by one or more symbols, such as 1, 2, 3, 4 symbols, etc.) from the last symbol 502 of the second part of the DCI within the PDSCH. For example, the previous timing relative to the last symbol of the PDCCH may be updated so as to be relative to the piggyback-offset symbol 502 in the PDSCH. In terms of timing, the piggybacked-offset symbol 506 is neither as aggressive as the symbol 502 nor as conservative as the symbol 504. In some designs, the offset may be pre-defined (e.g., defined in the relevant standard). In other designs, the offset may be configured via higher-layer signaling (e.g., RRC signaling). In an example, if the offset would extend outside of the PDSCH, then the reference symbol may be bounded (or capped) to the last symbol 504 in the PDSCH. In some designs, the offset may be configured as a function of a number of DMRSs after the last symbol 502 of the second part of the DCI within the PDSCH. In the embodiment depicted in FIG. 5, there are two DMRSs after the last symbol 502 of the piggybacked DCI, which can be used to set the offset (e.g., a symbol offset of 2 to match the post-symbol 502 DMRS count, a symbol offset of 2×2=4 to be twice as much as the post-symbol 502 DMRS count, etc.).

Referring to FIG. 5, in a fourth example, if there is a DMRS after a last symbol (i.e., symbol 502) of the second part of the DCI within the PDSCH (i.e., the piggybacked DCI), then the reference symbol may correspond to a last symbol 508 of a first DMRS instance after the last DCI symbol 502. For example, the previous timing relative to the last symbol of the PDCCH may be updated so as to be relative to the post-DCI DMRS symbol 508. In terms of timing, the symbol 508 is neither as aggressive as the symbol 502 nor as conservative as the symbol 504. In an example, if there is no DMRS following the symbol 502, then the end-of-PDSCH symbol 504 may be a fallback option for the reference symbol.

Figure 6:
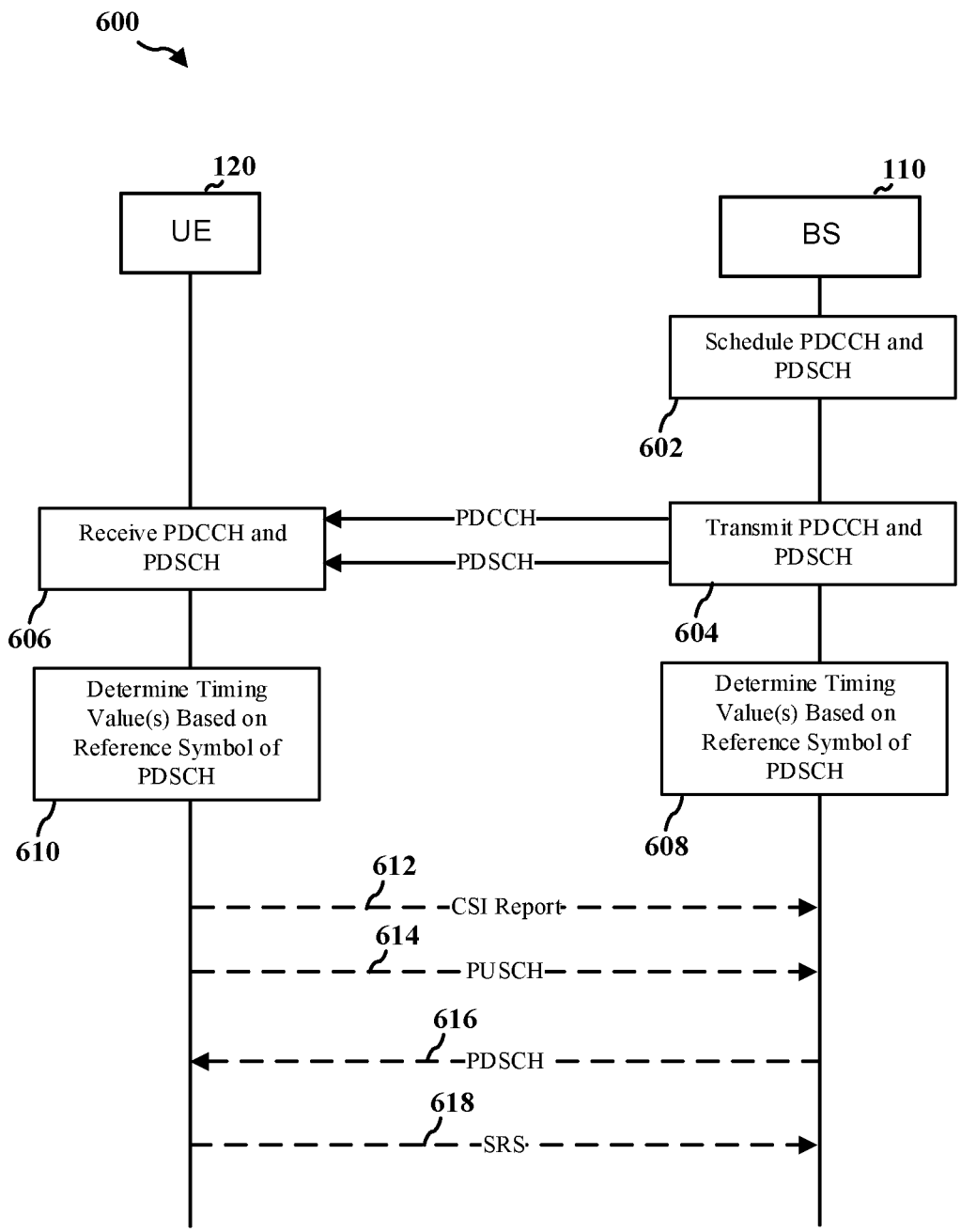
FIG. 6 illustrates an example implementation of the processes of FIGS. 3-4 in accordance with an embodiment of the disclosure.

FIG. 6 illustrates an example implementation 600 of the processes 300-400 of FIGS. 3-4 in accordance with an embodiment of the disclosure.

At 602, BS 110 schedules transmission of the PDCCH and PDSCH. In an example, 602 may correspond to 302 of FIG. 3 (e.g., the scheduled PDCCH may comprise a first DCI part with the PDSCH comprising a piggybacked second DCI part, etc.). The second DCI part may be associated with one or more grants, such as UL grant(s), DL grant(s) or a combination thereof, which in turn may be associated with a single UE or multiple UEs.

At 604, BS 110 transmits the PDCCH and PDSCH to UE 120 (e.g., and possibly other UEs associated with the grant(s) in one or more DCIs of the second DCI part of the PDSCH), and the UE 120 receives the PDCCH and PDSCH at 606. In an example, 604-606 of FIG. 6 may correspond to 306 of FIG. 3 and 402 of FIG. 4, respectively. In an example, the transmission of the PDCCH and the PDSCH at 604-606 may occur within a single slot or across multiple slots.

At 608, BS 110 determines timing value(s) based on a PDSCH reference symbol (e.g., one of symbols 502-508 in FIG. 5). In an example, 608 may correspond to 304 of FIG. 3, whereby the reference symbol used for the timing value determination may follow the DCI part within the PDSCH. In some designs, the at least one timing value may comprise a time offset between the effective receive time for the PDCCH and a DCI report, a time offset between the effective receive time for the PDCCH and a PUSCH communication, a time offset between the effective receive time for the PDCCH and a PDSCH communication, or a time offset between the effective receive time for the PDCCH and a Sounding Reference Signal (SRS) communication, or any combination thereof. In some designs, the at least one timing value may be applicable to a DCI-to-beam switching time offset and/or a DCI-to-bandwidth part (BWP) time offset (e.g., to sync in timing with respect to beam transitions or frequency hops, etc.).

At 610, UE 120 determines timing value(s) based on a PDSCH reference symbol (e.g., one of symbols 502-508 in FIG. 5). In an example, 610 may correspond to 404 of FIG. 4, whereby the reference symbol used for the timing value determination may follow the DCI part within the PDSCH. In some designs, the at least one timing value may comprise a time offset between the effective receive time for the PDCCH and a DCI report, a time offset between the effective receive time for the PDCCH and a PUSCH communication, a time offset between the effective receive time for the PDCCH and a PDSCH communication, or a time offset between the effective receive time for the PDCCH and a Sounding Reference Signal (SRS) communication, or any combination thereof. In some designs, the at least one timing value may be applicable to a DCI-to-beam switching time offset and/or a DCI-to-bandwidth part (BWP) time offset (e.g., to sync in timing with respect to beam transitions or frequency hops, etc.). In an example, the timing value(s) are independently determined at BS 110 and UE 120 for timing synchronization with respect to UL and/or DL transmissions.

At 612, UE 120 optionally transmits a CSI report to BS 110 based on the timing value(s). In an example, the reference symbol used to determine the timing value(s) at 612 may be based on PDSCH reference symbol, such as any of symbols 502-508 depicted in FIG. 5.

At 614, UE 120 optionally transmits a PUSCH to BS 110 based on the timing value(s). In an example, the reference symbol used to determine the timing value(s) at 614 may be based on PDSCH reference symbol, such as any of symbols 502-508 depicted in FIG. 5.

At 616, BS 110 optionally transmits a PDSCH to UE 120 based on the timing value(s). In an example, the reference symbol used to determine the timing value(s) at 616 may be based on PDSCH reference symbol, such as any of symbols 502-508 depicted in FIG. 5.

At 618, UE 120 optionally transmits an SRS to BS 110 based on the timing value(s). In an example, the reference symbol used to determine the timing value(s) at 618 may be based on PDSCH reference symbol, such as any of symbols 502-508 depicted in FIG. 5.

Figure 7:
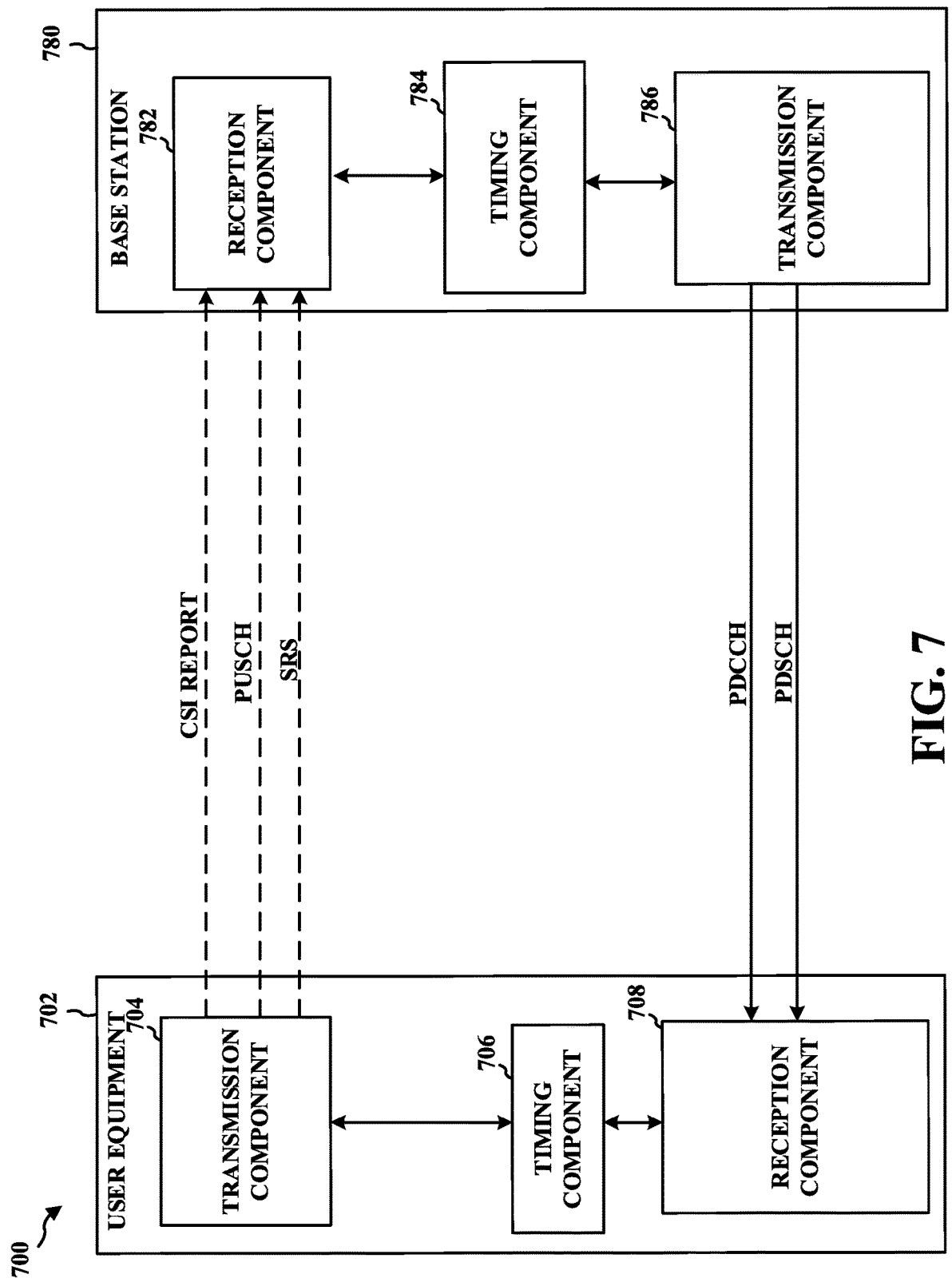
FIG. 7 is a conceptual data flow diagram illustrating the data flow between different means/components in exemplary apparatuses in accordance with an embodiment of the disclosure.

FIG. 7 is a conceptual data flow diagram 700 illustrating the data flow between different means/components in exemplary apparatuses 702 and 780 in accordance with an embodiment of the disclosure. The apparatus 702 may be a UE (e.g., UE 120) in communication with an apparatus 780, which may be a base station (e.g., base station 110).

The apparatus 702 includes a transmission component 704, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 702 further includes timing component 706, which may correspond to processor circuitry in UE 120 as depicted in FIG. 2, including controller/processor 280, etc. The apparatus 702 further includes a reception component 708, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 780 includes a reception component 782, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 780 further optionally includes a timing component 784, which may correspond to processor circuitry in BS 110 as depicted in FIG. 2, including controller/processor 240. The apparatus 780 further includes a transmission component 786, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 7, the transmission component 786 schedules and transmits, to the reception component 708, a PDCCH, and a PDSCH, in accordance with aspects of the disclosure. The transmission component 704 optionally schedules and transmits, to the reception component 782, a CSI report, a PUSCH, and/or an SRS. The transmission of the CSI report, PUSCH, SRS and/or PDSCH may be based on timing value(s) determined by the timing components 706 and 784.

One or more components of the apparatus 702 and apparatus 780 may perform each of the blocks of the algorithm in the aforementioned flowcharts of FIGS. 3-4 and 6. As such, each block in the aforementioned flowcharts of FIGS. 3-4 and 6 may be performed by a component and the apparatus 702 and apparatus 780 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
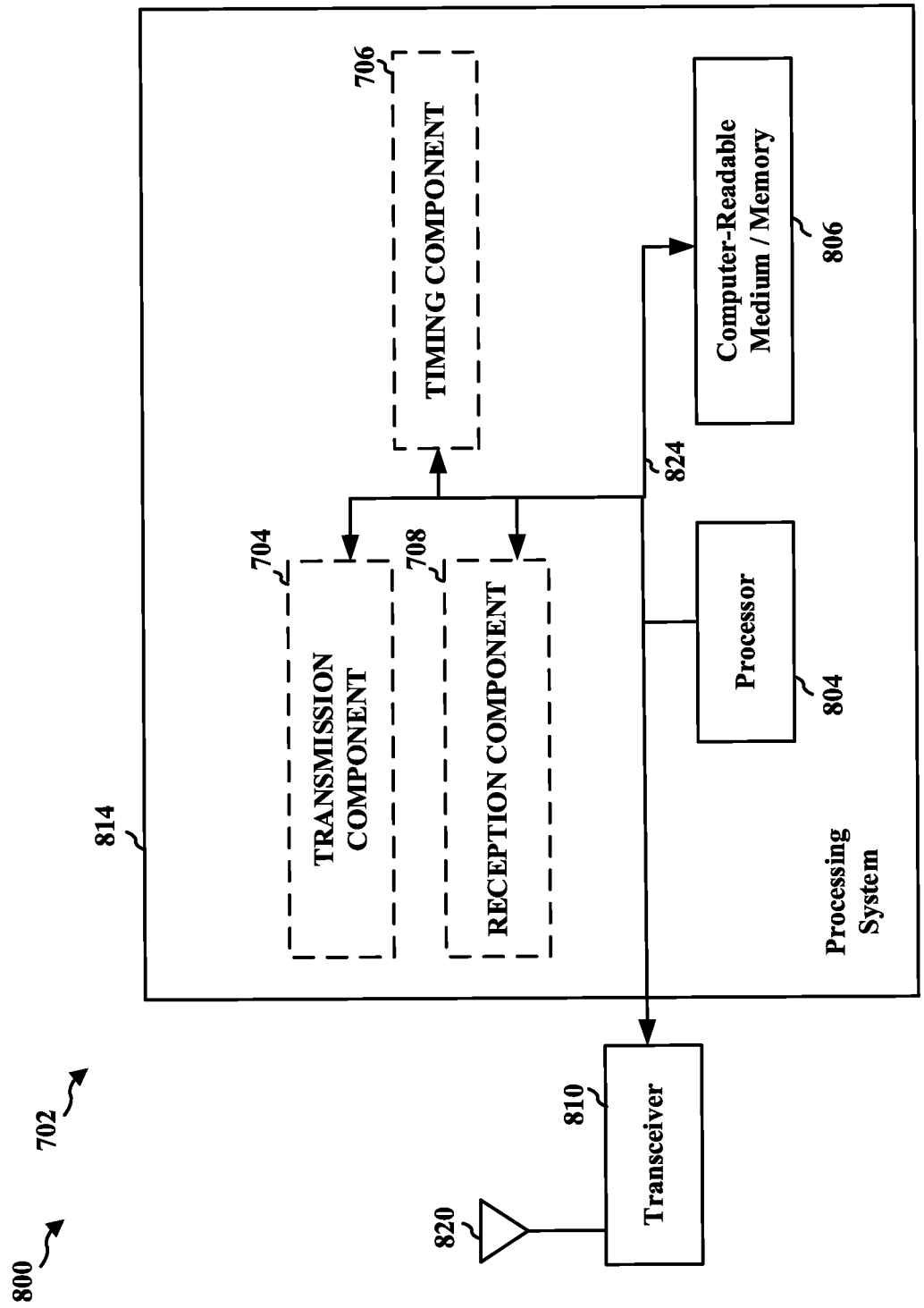
FIG. 8 is a diagram illustrating an example of a hardware implementation for an apparatus employing a processing system.

FIG. 8 is a diagram 800 illustrating an example of a hardware implementation for an apparatus 702 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706 and 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 708. In addition, the transceiver 810 receives information from the processing system 814, specifically the transmission component 704, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706 and 708. The components may be software components running in the processor 804, resident/stored in the computer readable medium/memory 806, one or more hardware components coupled to the processor 804, or some combination thereof. The processing system 814 may be a component of the UE 120 of FIG. 2 and may include the memory 282, and/or at least one of the TX processor 264, the RX processor 258, and the controller/processor 280.

In one configuration, the apparatus 702 (e.g., a UE) for wireless communication includes means for receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI, and means for determining at least one timing value associated with an effective receive time for the PDCCH based upon a reference symbol of the PDSCH.

The aforementioned means may be one or more of the aforementioned components of the apparatus 702 and/or the processing system 814 of the apparatus 702 configured to perform the functions recited by the aforementioned means. As described supra, the processing system 814 may include the TX processor 264, the RX processor 258, and the controller/processor 280.

Figure 9:
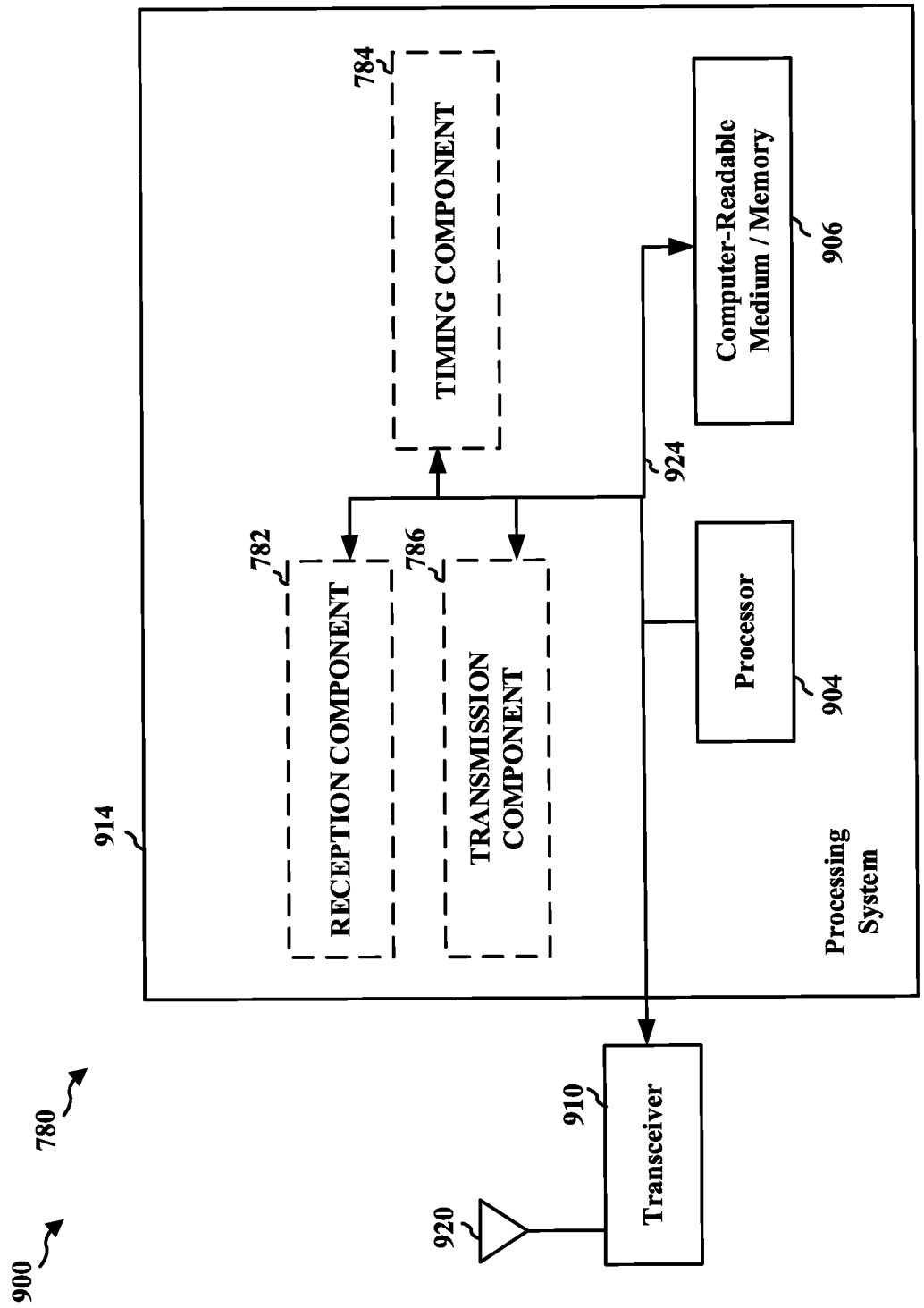
FIG. 9 is a diagram illustrating another example of a hardware implementation for an apparatus employing a processing system.

FIG. 9 is a diagram 900 illustrating an example of a hardware implementation for an apparatus 780 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 782, 784 and 786, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 782. In addition, the transceiver 910 receives information from the processing system 914, specifically the transmission component 786, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 782, 784 and 786. The components may be software components running in the processor 904, resident/stored in the computer readable medium/memory 906, one or more hardware components coupled to the processor 904, or some combination thereof. The processing system 914 may be a component of the BS 110 of FIG. 2 and may include the memory 242, and/or at least one of the TX processor 220, the RX processor 238, and the controller/processor 240.

In one configuration, the apparatus 780 (e.g., a BS) for wireless communication includes means for scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, means for determining at least one timing value associated with an effective receive time for the PDCCH based upon a reference symbol of the PDSCH, and means for transmitting the PDCCH and the PDSCH during the at least one slot The aforementioned means may be one or more of the aforementioned components of the apparatus 780 and/or the processing system 914 of the apparatus 780 configured to perform the functions recited by the aforementioned means. As described supra, the processing system 914 may include the TX processor 220, the RX processor 238, and the controller/processor 240.

Clause 1. A method of operating a user equipment (UE), comprising: receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI; and determining at least one timing value associated with an effective receive time for the PDCCH based upon a reference symbol of the PDSCH.

Clause 3. The method of any of clauses 1 to 2, first part of the DCI includes a control information field associated with the second part of the DCI within the PDSCH.

Clause 4. The method of any of clauses 1 to 3, wherein the reference symbol of the PDSCH corresponds to a last symbol of the second part of the DCI within the PDSCH.

Clause 5. The method of any of clauses 1 to 4, wherein the reference symbol of the PDSCH corresponds to a last symbol of the PDSCH.

Clause 6. The method of any of clauses 1 to 5, wherein the reference symbol of the PDSCH is offset from a last symbol of the second part of the DCI within the PDSCH.

Clause 7. The method of clause 6, wherein the offset is pre-defined, or wherein the offset is configured via higher-layer signaling.

Clause 8. The method of any of clauses 6 to 7, wherein the offset is a function of a number of Demodulation Reference Signals (DMRSs) after the last symbol of the second part of the DCI within the PDSCH.

Clause 9. The method of any of clauses 1 to 8, wherein, if there is a Demodulation Reference Signal (DMRS) after a last symbol of the second part of the DCI within the PDSCH, then the reference symbol corresponds to a last symbol of a first DMRS instance after the last symbol of the second part of the DCI within the PDSCH.

Clause 10. The method of any of clauses 1 to 9, wherein the at least one timing value comprises: a time offset between the effective receive time for the PDCCH and a channel state information (CSI) report, a time offset between the effective receive time for the PDCCH and a Physical Uplink Shared Channel (PUSCH) communication, a time offset between the effective receive time for the PDCCH and a PDSCH communication, or a time offset between the effective receive time for the PDCCH and a Sounding Reference Signal (SRS) communication, or any combination thereof.

Clause 11. The method of clause 10, further comprising: performing, based on the at least one timing value, one or more of: transmitting the CSI report, or transmitting the PUSCH communication, or receiving the PDSCH communication, or receiving the SRS communication, or any combination thereof.

Clause 12. The method of any of clauses 1 to 11, wherein the second part of the DCI comprises one or more downlink (DL) grants, one or more uplink (UL) grants, or a combination thereof, or wherein the second part of the DCI comprises a first grant associated with a first UE and a second grant associated with a second UE, or a combination thereof.

Clause 13. A method of operating a base station, comprising: scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI; determining at least one timing value associated with an effective receive time for the PDCCH based upon a reference symbol of the PDSCH; and transmitting the PDCCH and the PDSCH during the at least one slot.

Clause 15. The method of any of clauses 13 to 14, wherein the first part of the DCI includes a control information field associated with the second part of the DCI within the PDSCH.

Clause 16. The method of any of clauses 13 to 15, wherein the reference symbol of the PDSCH corresponds to a last symbol of the second part of the DCI within the PDSCH.

Clause 17. The method of any of clauses 13 to 16, wherein the reference symbol of the PDSCH corresponds to a last symbol of the PDSCH.

Clause 18. The method of any of clauses 13 to 17, wherein the reference symbol of the PDSCH is offset from a last symbol of the second part of the DCI within the PDSCH.

Clause 19. The method of clause 18, wherein the offset is pre-defined, or wherein the offset is configured via higher-layer signaling.

Clause 20. The method of any of clauses 18 to 19, wherein the offset is a function of a number of Demodulation Reference Signals (DMRSs) after the last symbol of the second part of the DCI within the PDSCH.

Clause 21. The method of any of clauses 13 to 20, wherein, if there is a Demodulation Reference Signal (DMRS) after a last symbol of the second part of the DCI within the PDSCH, then the reference symbol corresponds to a last symbol of a first DMRS instance after the last symbol of the second part of the DCI within the PDSCH.

Clause 22. The method of any of clauses 13 to 21, wherein the at least one timing value comprises: a time offset between the effective receive time for the PDCCH and a channel state information (CSI) report, a time offset between the effective receive time for the PDCCH and a Physical Uplink Shared Channel (PUSCH) communication, a time offset between the effective receive time for the PDCCH and a PDSCH communication, or a time offset between the effective receive time for the PDCCH and a Sounding Reference Signal (SRS) communication, or any combination thereof.

Clause 23. The method of clause 22, further comprising: performing, based on the at least one timing value, one or more of: receiving the CSI report, or receiving the PUSCH communication, or transmitting the PDSCH communication, or receiving the SRS communication, or any combination thereof.

Clause 24. The method of any of clauses 13 to 23, wherein the second part of the DCI comprises one or more downlink (DL) grants, one or more uplink (UL) grants, or a combination thereof, or wherein the second part of the DCI comprises a first grant associated with a first UE and a second grant associated with a second UE, or a combination thereof.

Clause 25. An apparatus comprising a memory and at least one processor communicatively coupled to the memory, the memory and the at least one processor configured to perform a method according to any of clauses 1 to 24.

Clause 26. An apparatus comprising means for performing a method according to any of clauses 1 to 24.

Clause 27. A non-transitory computer-readable medium storing computer-executable instructions, the computer-executable comprising at least one instruction for causing a computer or processor to perform a method according to any of clauses 1 to 24.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a user equipment (UE), comprising:
receiving, during at least one slot, transmission from a network component of a Physical Downlink Control Channel (PDCCH) and a Physical Downlink Shared Channel (PDSCH) that follows the PDCCH, the PDCCH including a first part of a Downlink Control Information (DCI), the PDSCH including a second part of the DCI; and
determining at least one timing value associated with an effective receive time for the PDCCH based upon a reference symbol of the PDSCH.

2. The method of claim 1,
wherein the first and second parts of the DCI comprise a two-part DCI, and
wherein the second part of the two-part DCI is transmitted after the first part of the two-part DCI and comprises information that supplements information provided by the first part of the two-part DCI.

3. The method of claim 1, wherein the first part of the DCI includes a control information field associated with the second part of the DCI within the PDSCH.

4. The method of claim 1, wherein the reference symbol of the PDSCH corresponds to a last symbol of the second part of the DCI within the PDSCH.

5. The method of claim 1, wherein the reference symbol of the PDSCH corresponds to a last symbol of the PDSCH.

6. The method of claim 1, wherein the reference symbol of the PDSCH is offset from a last symbol of the second part of the DCI within the PDSCH.

7. The method of claim 6,
wherein the offset is pre-defined, or
wherein the offset is configured via higher-layer signaling.

8. The method of claim 6, wherein the offset is a function of a number of Demodulation Reference Signals (DMRSs) after the last symbol of the second part of the DCI within the PDSCH.

9. The method of claim 1, wherein, if there is a Demodulation Reference Signal (DMRS) after a last symbol of the second part of the DCI within the PDSCH, then the reference symbol corresponds to a last symbol of a first DMRS instance after the last symbol of the second part of the DCI within the PDSCH.

10. The method of claim 1, wherein the at least one timing value comprises:
a time offset between the effective receive time for the PDCCH and a channel state information (CSI) report,
a time offset between the effective receive time for the PDCCH and a Physical Uplink Shared Channel (PUSCH) communication,
a time offset between the effective receive time for the PDCCH and a PDSCH communication, or
a time offset between the effective receive time for the PDCCH and a Sounding Reference Signal (SRS) communication, or
any combination thereof.

11. The method of claim 10, further comprising:
performing, based on the at least one timing value, one or more of:
transmitting the CSI report, or
transmitting the PUSCH communication, or
receiving the PDSCH communication, or
receiving the SRS communication, or
any combination thereof.

12. The method of claim 1,
wherein the second part of the DCI comprises one or more downlink (DL) grants, one or more uplink (UL) grants, or a combination thereof, or
wherein the second part of the DCI comprises a first grant associated with a first UE and a second grant associated with a second UE, or
a combination thereof.

13. A method of operating a network component, comprising:
scheduling, during at least one slot, transmission of a Physical Downlink Control Channel (PDCCH) and a Physical Downlink Shared Channel (PDSCH) that follows the PDCCH, the PDCCH including a first part of a Downlink Control Information (DCI), the PDSCH including a second part of the DCI;
determining at least one timing value associated with an effective receive time for the PDCCH based upon a reference symbol of the PDSCH; and
transmitting the PDCCH and the PDSCH during the at least one slot.

14. The method of claim 13,
wherein the first and second parts of the DCI comprise a two-part DCI, and
wherein the second part of the two-part DCI is transmitted after the first part of the two-part DCI and comprises information that supplements information provided by the first part of the two-part DCI.

15. The method of claim 13, wherein the first part of the DCI includes a control information field associated with the second part of the DCI within the PDSCH.

16. The method of claim 13, wherein the reference symbol of the PDSCH corresponds to a last symbol of the second part of the DCI within the PDSCH.

17. The method of claim 13, wherein the reference symbol of the PDSCH corresponds to a last symbol of the PDSCH.

18. The method of claim 13, wherein the reference symbol of the PDSCH is offset from a last symbol of the second part of the DCI within the PDSCH.

19. The method of claim 18,
wherein the offset is pre-defined, or
wherein the offset is configured via higher-layer signaling.

20. The method of claim 18, wherein the offset is a function of a number of Demodulation Reference Signals (DMRSs) after the last symbol of the second part of the DCI within the PDSCH.

21. The method of claim 13, wherein, if there is a Demodulation Reference Signal (DMRS) after a last symbol of the second part of the DCI within the PDSCH, then the reference symbol corresponds to a last symbol of a first DMRS instance after the last symbol of the second part of the DCI within the PDSCH.

22. The method of claim 13, wherein the at least one timing value comprises:
a time offset between the effective receive time for the PDCCH and a channel state information (CSI) report,
a time offset between the effective receive time for the PDCCH and a Physical Uplink Shared Channel (PUSCH) communication, a time offset between the effective receive time for the PDCCH and a PDSCH communication, or a time offset between the effective receive time for the PDCCH and a Sounding Reference Signal (SRS) communication, or any combination thereof.

23. The method of claim 22, further comprising:
performing, based on the at least one timing value, one or more of:
   receiving the CSI report, or
   receiving the PUSCH communication, or
   transmitting the PDSCH communication, or
   receiving the SRS communication, or
   any combination thereof.

24. The method of claim 13,
wherein the second part of the DCI comprises one or more downlink (DL) grants, one or more uplink (UL) grants, or a combination thereof, or
wherein the second part of the DCI comprises a first grant associated with a first UE and a second grant associated with a second UE, or
a combination thereof.

25. A user equipment (UE), comprising:
a memory; and
at least one processor coupled to the memory and configured to:
   receive, during at least one slot, transmission from a network component of a Physical Downlink Control Channel (PDCCH) and a Physical Downlink Shared Channel (PDSCH) that follows the PDCCH, the PDCCH including a first part of a Downlink Control Information (DCI), the PDSCH including a second part of the DCI; and
   determine at least one timing value associated with an effective receive time for the PDCCH based upon a reference symbol of the PDSCH.

26. The UE of claim 25,
wherein the reference symbol of the PDSCH corresponds to a last symbol of the second part of the DCI within the PDSCH, or
wherein the reference symbol of the PDSCH corresponds to a last symbol of the PDSCH, or
wherein the reference symbol of the PDSCH is offset from a last symbol of the second part of the DCI within the PDSCH, or
any combination thereof.

27. The UE of claim 25, wherein the at least one timing value comprises:
a time offset between the effective receive time for the PDCCH and a channel state information (CSI) report,
a time offset between the effective receive time for the PDCCH and a Physical Uplink Shared Channel (PUSCH) communication,
a time offset between the effective receive time for the PDCCH and a PDSCH communication, or
a time offset between the effective receive time for the PDCCH and a Sounding Reference Signal (SRS) communication, or
any combination thereof.

28. A network component, comprising:
a memory; and
at least one processor coupled to the memory and configured to:
   schedule, during at least one slot, transmission of a Physical Downlink Control Channel (PDCCH) and a Physical Downlink Shared Channel (PDSCH), the PDCCH including a first part of a Downlink Control Information (DCI) that follows the PDCCH, the PDSCH including a second part of the DCI;
   determine at least one timing value associated with an effective receive time for the PDCCH based upon a reference symbol of the PDSCH; and
   transmit the PDCCH and the PDSCH during the at least one slot.

29. The network component of claim 28,
wherein the reference symbol of the PDSCH corresponds to a last symbol of the second part of the DCI within the PDSCH, or
wherein the reference symbol of the PDSCH corresponds to a last symbol of the PDSCH, or
wherein the reference symbol of the PDSCH is offset from a last symbol of the second part of the DCI within the PDSCH.

30. The network component of claim 28, wherein the at least one timing value comprises:
a time offset between the effective receive time for the PDCCH and a channel state information (CSI) report,
a time offset between the effective receive time for the PDCCH and a Physical Uplink Shared Channel (PUSCH) communication,
a time offset between the effective receive time for the PDCCH and a PDSCH communication, or
a time offset between the effective receive time for the PDCCH and a Sounding Reference Signal (SRS) communication, or
any combination thereof.

\* \* \* \* \*